United States Patent [19]

Biddick

[11] 4,129,633

[45] Dec. 12, 1978

[54] PROCESS AND APPARATUS FOR MANUFACTURE OF AN ELECTRODE

[75] Inventor: Royce E. Biddick, Edina, Minn.

[73] Assignee: Gould Inc., Mendota Heights, Minn.

[21] Appl. No.: 627,968

[22] Filed: Nov. 3, 1975

Related U.S. Application Data

[63] Continuation of Ser. No. 225,433, Feb. 11, 1972, abandoned.

[51] Int. Cl.² .......................................... C04B 35/00
[52] U.S. Cl. .................................... 264/40.3; 302/29; 302/66; 264/105; 264/121; 264/127; 264/171; 264/175; 264/273; 264/DIG. 51; 425/DIG. 20
[58] Field of Search ............... 264/105, 121, 171, 175, 264/DIG. 51, 127, 40.3, 273; 302/29, 30, 66; 425/DIG. 20

[56] References Cited

U.S. PATENT DOCUMENTS

| 3,027,601 | 4/1962 | Barry | 264/175 X |
| 3,195,958 | 7/1965 | Goins | 264/40.3 X |
| 3,674,389 | 7/1972 | Sturgeon | 425/DIG. 20 |

FOREIGN PATENT DOCUMENTS 931732 7/1963 United Kingdom.

*Primary Examiner*—Thomas P. Pavelko
*Attorney, Agent, or Firm*—Jacobson and Johnson

[57] ABSTRACT

An improved process for making a gas diffusion electrode which comprises heating of the mixed electrode material prior to forming the electrode. Because of the stickiness or self adhesion characteristics of the electrode mixture, the invention includes special transport apparatus having a fluidized bed that uniformly disperses the sticky electrode material onto a conveyor belt for forming the electrode without subsequent heating.

11 Claims, 1 Drawing Figure

U.S. Patent
Dec. 12, 1978
4,129,633
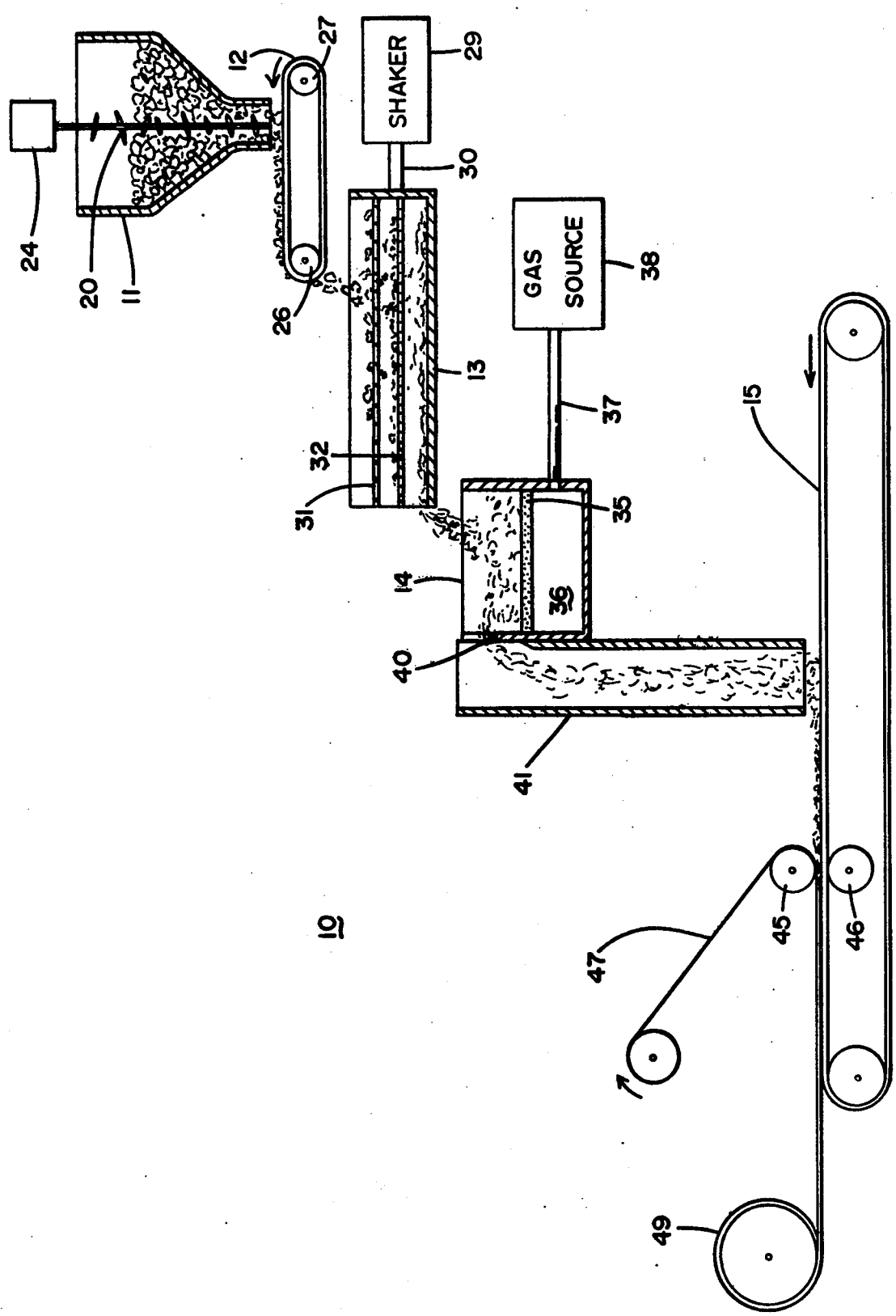

PROCESS AND APPARATUS FOR MANUFACTURE OF AN ELECTRODE

This is a continuation, of application Ser. No. 225,433, filed Feb. 11, 1972 now abandoned.

BACKGROUND OF THE INVENTION

1. Field of the Invention

This invention relates generally to electrodes for gas depolarized batteries and, more specifically, to a process for manufacturing air electrodes and apparatus for handling the sticky air electrode material during the forming steps of the process.

2. Description of the Prior Art

Typically, the prior art procedures and techniques for making gas diffusion or air electrodes teach applying a paste or slurry electrode mixture, which includes a catalyst and a hydrophobic binder, such as polytetrafluoroethylene, to a large screen, drying the mixture on the screen and then curing or sintering the mixture. The electrode material is then cut into the final electrode sizes. While this process works well for the manufacture of air electrodes, it has certain drawbacks. For example, it is difficult and awkward to dry and sinter the electrode mixture when it is on a large screen. Also the sintering or curing of the electrode mixture must be done in an inert atmosphere in order to avoid oxidization of catalyst in the mixture. This is also awkward and difficult to do because of the large sizes of the uncut electrode. Thus, the difficulties of the prior art techniques of forming an electrode and then sintering or curing are avoided with the present process as it allows one to cure the electrode mixture in the bulk form prior to the forming process.

Also one of the problems with the prior art process is the difficulty in forming a continuous electrode strip.

Another drawback to the prior art process is that when the paste or slurry is heated on the collector screen, there is a tendency of the electrode mixture to contract thus producing cracks in the electrode.

One of the difficulties with heat treatment of the bulk electrode mixture prior to forming the electrode is that the bulk electrode mixture with the hydrophobic binder is very sticky and difficult to handle. That is, the binder material tends to lump or conglomerate thus making it difficult to handle when in a mixed state. Therefore, part of the present invention resides in the fact that I have discovered how to handle and uniformly control the dispersion of the sticky, bulk electrode mixture.

While the present invention relates to use of a fluidized bed for handling the electrode material, it should not be confused with prior art apparatus such as shown in Bahler et al. U.S. Pat. No. 3,551,210. Bahler et al. uses a fluidized bed to aerate or reduce the bulk density of his PVC particles and a comb and vacuum skimmer to produce an even mound of particles. In contrast, the present invention utilizes a fluidized bed to distribute the particle to a uniform depth over a predetermined area so that the particles can be compressed into a self adhering electrode.

Further aspects of the invention include the process itself as well as the apparatus for dispersing and forming the electrode.

SUMMARY OF THE INVENTION

Briefly, one aspect of the invention comprises the discovery that the use of a fluidized bed for handling the sticky bulk electrode mixture prevents the conglomeration of the particles in the electrode mixture and allows one to uniformly distribute the particles of the electrode over a predetermined area so that the particles can be compressed into a self adhering electrode.

A further aspect of the invention comprises apparatus for handling the sticky bulk electrode material and forming it into an electrode.

A still further aspect of the invention comprises the process of heating or curing the bulk electrode mixture prior to forming the mixture into an electrode.

BRIEF DESCRIPTION OF THE DRAWING

Referring to the drawing, the sole figure shows apparatus for receiving the sticky bulk electrode mixture of a catalyst and binder and subsequently forming the electrode mixture into an electrode.

DESCRIPTION OF THE PREFERRED EMBODIMENT

Briefly, in the process of my invention I prepare the electrode mixture in slurry form from a suitable catalyst and a hydrophobic binder. Next, I take the mixture in the slurry form and place it in an inert atmosphere for about one hour at approximately 260° C. The time and temperature of heating may be varied within wide ranges, however, the limiting temperature for the material is dependent upon the hydrophobic binder material. For example, if polytetrafluoroethylene is used as the binder, then the temperature should not exceed 327° C. which is the melting point of the polytetrafluoroethylene. However, as a practical matter, I usually maintain the temperature well below the melting temperature of the material used as a binder.

Also, while temperatures less than 100° C. can be used for heating the mixture, it is preferred to use a minimum temperature above 100° C. as the time of heating generally increases with lower temperatures.

Furthermore, while the time of heating can vary within broad ranges, as a practical matter, a minimum time of approximately five minutes is necessary to drive off any unwanted materials.

In general, the purposes of heating the electrode mixture are to remove excess water and remove any unwanted materials present in the emulsion. In addition, in certain instances one may wish to heat the mixture to activate the catalyst. It should be pointed out that applicant's reasons for heating or curing of the electrode mixture do not materially differ from the prior art reasons for heating or curing. However, applicant's process differs from the prior art in that applicant heats the electrode mixture prior to forming the electrode (i.e., when the electrode mixture is in a bulk state).

After the material has been heated in an inert atmosphere to prevent oxidation of the catalyst, it is removed and prepared for the next step. When the material comes out of the heating step, it is contracted and appears as large flat lumps. In this state, the exterior of the lumps are not sticky but the interior of the lumps are quite sticky. The bulk electrode mixture in lump form can be applied directly to the collector screen by a spatula or the like. However, spreading out the lumpy material on a screen is not only tedious but it is also difficult to produce an electrode of uniform density. Therefore, in the preferred process one breaks up or grinds the lumps which produces small, sticky particles which can be uniformly spread on a conveyor belt. As it is difficult to handle the sticky particles in the ground state without producing conglomeration of particles, I have also invented an apparatus for handling and uniformly distributing the mixture is particle form.

After breakup of the lumps, the sticky bulk electrode mixture is spread uniformly onto a conveyor belt at a typical loading of approximately 27 milligrams per square centimeter. The loading or spreading will vary as the composition of the electrode mixture materials vary and also as the thickness of the final electrode varies. However, for the manufacture of a typical air electrode a loading of 27 milligrams per square centimeter can be compressed into an electrode having a thickness of approximately 0.020 inches.

After the electrode mixture is spread on the conveyor belt, the belt and electrode mixture and a metal screen pass between a pair of rollers where the screen and the electrode mixture are compressed therebetween to form an electrode. The compression of the screen and the electrode mixture forms a unitary construction with the electrode mix adhering to itself as well as the metal screen. Typically, the metal screen which functions as a current collector comprises a corrosion resistant material such as nickel, however, no limitation is intended thereto.

In the preferred method, the collector screen is compressed into the electrode mixture, however, the collector screen need not be compressed in the electrode mixture as other current collectors such as pins or tabs can also be used.

The following examples will serve to illustrate in fuller detail the process steps involved in forming the electrode.

EXAMPLE 1

Carbon Black — 16.7 grams
Silver Nitrate — 5.7 grams
Polytetrafluoroethylene Emulsion (60% by weight) — 60.9 grams The materials are mixed until the mixture appeared uniform. The electrode mixture is then placed in an inert atmosphere where it is heated to 260° C. for about one hour. The electrode mixture is removed and ground in a Waring blender to a minus 40 mesh on a Tyler scale. The electrode mixture is then spread onto a rubber belt to a loading of about 27 milligrams per square centimeter. Next, a 40 mesh nickel screen having 0.007 diameter strands is pressed into the electrode mixture by passing the screen and the electrode mixture through a rolling mill. The completed self adhering electrode emerged from the opposite side of the rolling mill with a total thickness of 0.019 inches. In this particular forming process, the mesh of the screen was almost completely filled with the electrode mixture with a 0.005 inch layer of electrode mixture on one side.

EXAMPLE 2

Prewetted Carbon Black — 69.9 grams
Polypropylene in Emulsion Form — 10.0 grams
Powdered Carboxymethyl Cellulose — 1.0 grams
Manganese Nitrate $Mn(NO_3)_2$ (52% solution) — 38.5 grams The materials are mixed until the mixture appears uniform. This mixture is then heated in a closed tray for approximately one hour at 100° C. It may be noted that with this particular mixture the temperature of heating the mixture was considerably lower than with the polytetrafluoroethylene because the meltint temperature of the hydrophobic polypropylene binder is about 168° C. compared to 327° C. for the polytetrafluoroethylene binder. The electrode mixture is then ground and formed into an electrode in the same manner described with respect to the electrode of Example 1. While the preferred process has been described with respect to the manufacture of an air electrode, the process can also be used in the manufacture of other gas electrodes. For example, in order to manufacture a hydrogen electrode, one could use chloroplatinic acid in place of either the silver nitrate or the manganese nitrate in the two examples.

While the description of the process of forming the electrode mixture into an electrode has been described in general, the details of the handling and forming will now be described in greater detail. The apparatus for handling and dispensing the sticky, bulk electrode mixture after heat treating is shown in the drawing. Reference numeral 10 designates the apparatus for handling and dispensing the sticky, bulk electrode mixture prior to compressing it into an electrode. Briefly, the invention comprises a hopper 11 for receiving the electrode mixture, a conveyor belt 12 for metering the electrode mixture onto a shaker bin or bed 13, a fluidizing chamber 14 for dispersing the electrode mix onto a conveyor 15 and a pair of compression rollers 45 and 46 for forming the sticky, bulk electrode mixture into a self-supporting or self adhering electrode.

More specifically, hopper 11 includes an opening for pouring the bulk electrode mixture therein. Because the electrode mixture is sticky or tacky, the particles in the electrode mixture will not readily pour or flow from hopper 11. Instead, the particles tend to adhere to each other and form soft lumps which prevent the electrode mixture from flowing onto conveyor belt 12. Therefore, in order to dispense the electrode mixture onto conveyor 12, it is necessary to agitate or gently force the electrode mixture from the hopper in a controlled manner. In order to gently force the electrode mixture from hopper 11, there is provided a motor 24 to turn an agitator rod 20 having projections or blades 21 thereon. Rotating agitator rod 20 feeds the electrode mixture from hopper 11 at a predetermined rate which is determined by the distance between the end of hopper 11 and conveyor belt 12 and the speed of conveyor belt 12. Thus, in operation the bulk electrode material falls into the opening between the end of the hopper 11 and conveyor belt 12 which produces a mound or uniform layer of bulk electrode particles. Conveyor belt 12, which comprises a belt supported by rollers 26 and 27, rotates counterclockwise thus feeding the bulk electrode mixture into a shaker bin 13. Shaker bin 13 is powered by a conventional shaker apparatus 29 through a mechanical arm 30. Shaker bin 13 includes a first screen 31 and a second screen 32. Screens 31 and 32 are not necessary to the invention other than to insure that the electrode mixture leaving shaker bin 13 does not contain any lumps or large size particles because it has been found that the action of the shaker bin is sufficient to break up any soft lumps formed after grinding. During operation of shaker bin 13, the electrode mixture falls through the screens and onto the bottom of shaker bin 13 whereupon due to the shaking action, the particles in the electrode mixture fall from shaker bin 13 into a fluidizing chamber 14.

Fluidizing chamber 14 comprises the heart of the apparatus for handling and uniformly dispersing the electrode mixture because it allows one to uniformly disperse or distribute the electrode mixture onto conveyor 15. Typically, fluidizing chamber 14 comprises a bottom, porous sintered metal section 35, a plenum chamber 36 and a gas inlet 37 which is connected to a suitable gas source 38. In order to produce a fluidized bed, one supplies gas under sufficient pressure to produce gas velocities which are intermediate between the velocity which would lift the particles and maintain the particles in a uniform suspension and that velocity which would blow the particles out of the container. Generally, the pressure is determined by observing the particle behavior rather than using a predetermined pressure setting. Porous sintered section 35 can be any suitable sintered material or gas resistor which is nonreactive with the electrode mixture. For example, sintered nickel is a suitable material because it resists corrosion from most electrode mixtures.

As can be seen in the drawing, particles in the electrode mixture are suspended in the turbulent air flow in fluidizing chamber 14. Located at the edge of fluidizing chamber 14 is a straight spout, opening, or weir which corresponds in length to the width of the electrode to be formed on belt 15. Because the fluidized particles behave like a liquid, they fall over weir 40 similar to water at a constant head flowing over a weir. That is, it has been discovered that with a fluidized bed even that sticky or self adhering particles in the electrode mixture can be uniformly distributed from weir 40 onto conveyor 15 through a chute 41. The purpose of chute 41 is to prevent any air currents from blowing the particles off course as they fall onto conveyor 15. Thus, chute 41 need not be used if there are no stray air currents present in the vicinity of the apparatus. Once on conveyor belt 15, the electrode mixture and a collector screen 47 pass between compression roller 45 and compression roller 46. Collector screen 47 is an elongated strip of screen in roll form which passes over roller 45 and between rollers 45 and 46 at the same time the electrode particles pass therebetween. Typically, collector screen is a material such as nickel. Roller 45 and 46 are connected together by a housing (not shown) so as to maintain a predetermined spacing therebetween and thus apply sufficient force to form the loose sticky particles of the electrode mixture into a self adhering electrode. As the screen and the electrode mixture are compressed, they form a continuous elongated electrode which continues down conveyor 15 and on to a takeup wheel 49.

As mentioned previously, the amount of force applied to compress the material varies as the particular material that is used. However, sufficient force must be applied so as to compact the sticky particles in the electrode mixture into an electrode which is self-supporting. Thus, the compression forces vary within wide ranges depending upon the material in the electrode mixture. Thus, adjusting the depth or loading of particles falling onto the conveyor belt as well as the final dimension of the electrode leaving the rollers provides a convenient way of determining the porosity of the final product.

While the electrode can be used as it comes off the press, one can also place a hydrophobic layer on the exterior surface of the electrode to insure that the electrode does not leak.

I claim:
1. The process for manufacture of a continuous electrode comprising:
   preparing a bulk electrode material including a hydrophobic binder comprised of sticky electrode material particles;
   fluidizing the sticky electrode material particles in a fluid stream by observing sticky electrode particle behavior in a fluid stream and controlling the fluid stream such that particles are maintained in a uniform suspension allowing a uniform flow of sticky electrode particles over a weir onto a moving member to thereby produce a continuous strip of electrode particles; and
   then compressing the electrode particles to produce a continuous electrode.
2. The process for manufacture of a continuous electrode as described in claim 1 wherein said bulk electrode material is heated to drive off unwanted suspension materials in the bulk electrode material to thereby produce an electrode material.
3. The process for manufacture of a continuous electrode as described in claim 1 wherein said bulk electrode material is characterized by self-adhesion.
4. The process for manufacture of a continuous electrode comprising:
   preparing a bulk electrode mixture including a hydrophobic binder having a predetermined melting temperature, said bulk electrode material characterized by self-adhesion;
   first heating the bulk electrode mixture to a temperature below the melting temperature of the hydrophobic binder to drive off unwanted suspension materials in the bulk electrode mixture to thereby produce large lumps of electrode mixture;
   breaking up the lumps of electrode mixture to produce self-adhering electrode particles;
   fluidizing the self-adhering electrode particles in a fluid stream by observing sticky electrode particle behavior in a fluid stream and controlling the fluid stream such that particles are maintained in a uniform suspension allowing a uniform flow of sticky electrode particles over a weir
   onto a moving member to thereby produce a continuous strip of self-adhering electrode particles; and
   then compressing the electrode particles to produce a continuous self-adhering electrode.
5. The process of claim 4 wherein the time of heating the electrode mixture is a minimum of 5 minutes.
6. The process of claim 4 wherein the hydrophobic binder comprises polytetrafluoroethylene.
7. The process of claim 4 wherein the hydrophobic binder comprises polypropylene.
8. The process of claim 4 including the step of shaking the bulk electrode mixture to break up any lumps formed therein.
9. The process of claim 8 including the step of directing the fluidized self-adhering particles over a weir and onto a conveyor belt for compressing.
10. The process of claim 9 including the step of pressing a collector screen into said electrode mixture.
11. The process of claim 10 including compressing the electrode mixture between a pair of rollers.

* * * * *